ized by its strength, compactness, capacity
UNITED STATES PATENT OFFICE.

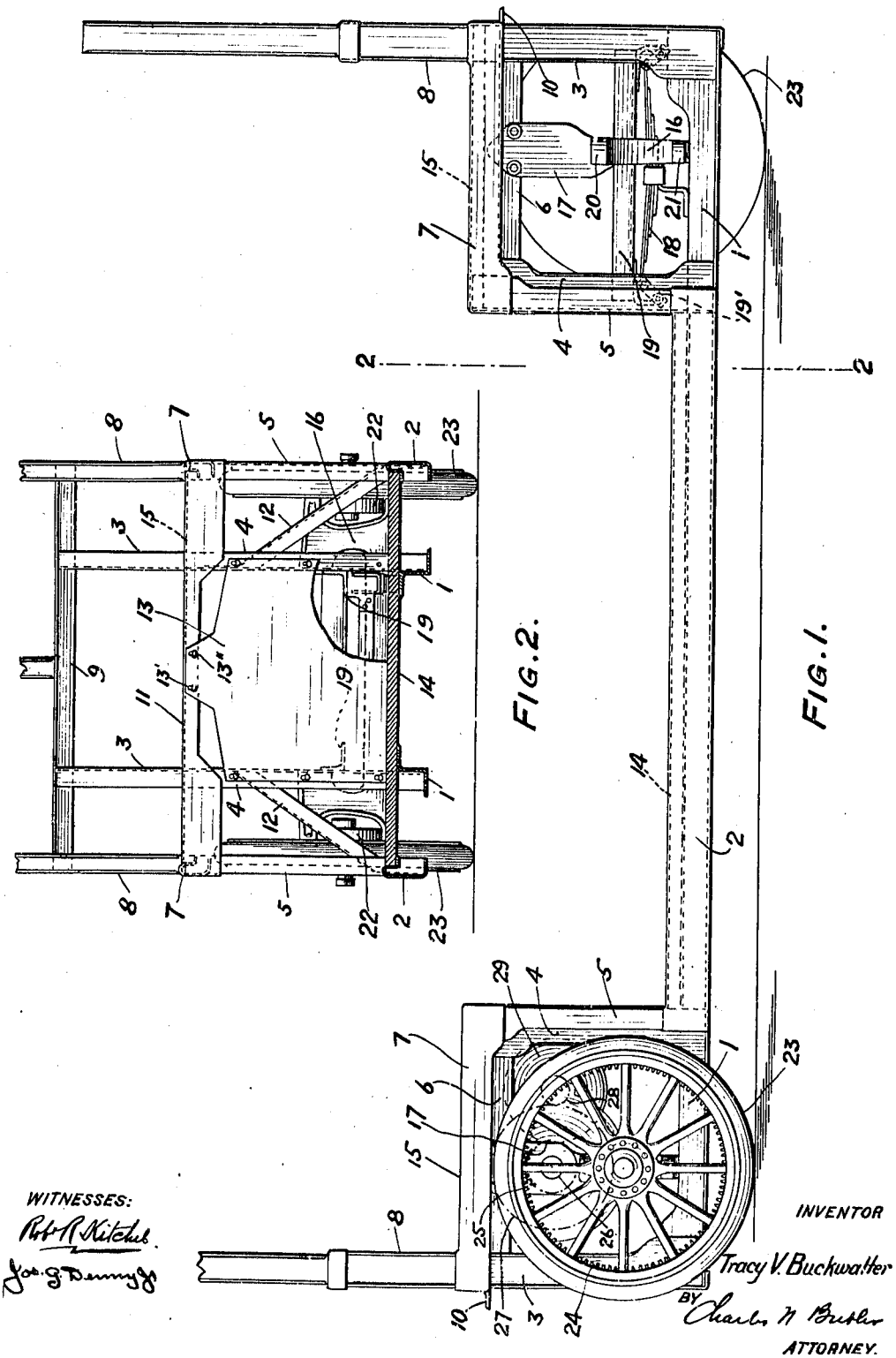

TRACY V. BUCKWALTER, OF ALTOONA, PENNSYLVANIA.

BAGGAGE-TRUCK.

993,823.  Specification of Letters Patent.  Patented May 30, 1911.

Application filed April 9, 1910. Serial No. 554,404.

*To all whom it may concern:*

Be it known that I, TRACY V. BUCKWALTER, a citizen of the United States, residing at Altoona, in the county of Blair and State of Pennsylvania, have invented certain Improvements in Baggage-Trucks, of which the following is a specification.

My invention is a baggage truck designed to provide a structure combining large capacity, convenience in loading and unloading, compactness and strength of construction.

The characteristic construction and functions of my improved truck are disclosed in the following description and the accompanying drawings in illustration thereof.

In the drawings, Figure 1 is a side elevation of a truck embodying my improvements, parts being removed; and Fig. 2 is a sectional elevation taken on the line 2—2 of Fig. 1.

The truck frame comprises the longitudinal interior beams 1, which extend the length of the truck, and the longitudinal side beams 2 of shorter length, extending between the corresponding wheels. Upright struts 3 and 4 are fixed to each end of the beams 1 respectively at and near the ends thereof, and upright struts 5 are fixed to the ends of the beams 2. Beams 6, parallel to the beams 1, connect the beams 3 and 4, and beams 7, parallel to the beams 2, connect the struts 5 with their parallel posts 8. Cross beams 9 and 10 connect the uprights 3 and 8 to form therewith rigid ends for the frame. Cross beams 11 connect the uprights 4 and 5 to provide lateral bracing for the wheel housings comprising the parts 3 to 7 inclusive, and diagonal braces 12 connect the members 4 and 5 to further stiffen the structure. A vertical shield 13 is connected to parts 4 and 11, being engaged detachably by the pins 13' which enter the eyes 13''. The beams 1 and 2 carry a lower floor or deck 14, between the wheels at the respective ends of the frame and the beams 6 and 7 carry the upper floors or decks 15 above the respective end wheels. Axles 16 support the frame, having the uprights 17 fixed to the beams 6.

Within the housing at one end of the frame, springs 18 are supported on beams 1, above an axle 16, and support ways 19 providing a cradle, which is adapted for carrying a battery used in propelling the truck, the cradle being connected with the springs by the shackles 19'. The shield 13 is removable to permit the battery to be passed between the struts 4 and slid along the ways into the desired position thereon.

Bearings 20 and 21 on the axles have journaled therein the knuckles 22 on which the wheels 23 are journaled substantially within the housings, the wheels lying within the frame's side members 2, 5, and 7. The wheels at an end of the frame, opposite that designed for carrying the battery, have fixed thereto the gears 24 which are driven by pinions 25, the latter being fixed on the shaft 26 journaled in uprights 17. The shaft 26 has fixed thereon a gear 27 which meshes with a gear 28 driven by the motor 29, the driving mechanism being contained within the corresponding housing.

The truck thus constructed is characterized by its strength, compactness, capacity and convenience. The floor extends over virtually the extreme plan of the mechanism. The wheels and the mechanism for driving them are housed within the frame, under the floor. Goods can be placed readily on the lower deck and thence on the upper decks, the space between the end uprights 8 being filled to the desired height. The structure is light in proportion to the load it carries. The manner of connecting the wheels, all of which turn on vertical axes within the limits of the frame, permit the truck to be handled with the greatest convenience practicable in proportion to its size.

Having described my invention, I claim:

1. A truck comprising a frame having a lower section and elevated end sections, traction wheels housed within said end sections for carrying said frame, and a motor housed within one of said end sections and connected with the wheels therein.

2. A truck comprising a frame having a lower section and elevated end sections, traction wheels housed within said end sections, means whereby said wheels support said frame and oscillate on vertical axes relatively thereto, motor mechanism housed within one of said end sections, and means whereby said motor revolves one or more of said wheels.

3. A truck comprising the combination of a frame with end wheels for supporting it, said frame comprising longitudinal beams disposed beneath the axes of said supporting wheels, struts supported by said beams, beams supported by said struts above said wheels, a platform supported by said first named beams and a platform supported by said second named beams.

4. In a baggage truck, the combination of a frame with supporting wheels at the respective ends thereof, said frame comprising longitudinal side beams beneath and between the axes of said wheels, interior beams parallel to said side beams and extending beneath and beyond the axes of said wheels, substantially vertical struts extending upwardly from the ends of said side beams, substantially vertical struts extending upwardly from said interior beams on either side of the respective wheel axes, longitudinal beams connected with said struts above said wheels, and lateral bracing for said frame.

5. In a baggage truck, the combination of a frame with end supporting wheels, said frame comprising a deck disposed between and beneath the axes of said wheels, decks above the respective end wheels, and a cradle supported beneath one of said last named decks.

6. In a baggage truck, the combination of a frame with end wheels, said frame comprising a housing for said wheels, a floor carried by said housing above said wheels, and a spring supported cradle within said housing, said cradle comprising ways adapted for guiding a battery.

7. In a baggage truck, the combination of a frame, wheels at the respective ends of said frame, and knuckles whereby said wheels support said frame, said frame comprising end housings having a deck above said wheels and a lower deck extending between said end housings.

8. In a baggage truck, a frame having a lower deck, an upper deck at each end thereof, housed beneath said upper decks traction wheels for supporting said frame, a motor, and mechanism driven by said motor for driving said wheels.

In witness whereof I have hereunto set my name this 7th day of April, 1910, in the presence of the subscribing witnesses.

TRACY V. BUCKWALTER.

Witnesses:
P. H. MARKLEY,
H. C. MINSTER.